Aug. 11, 1953  A. V. HEMMENS  2,648,225
LIQUID METERING DEVICE

Filed Jan. 15, 1951  3 Sheets-Sheet 2

INVENTOR
ALFRED V. HEMMENS
BY [signature] Atty.

Aug. 11, 1953 A. V. HEMMENS 2,648,225
LIQUID METERING DEVICE
Filed Jan. 15, 1951 3 Sheets-Sheet 3

INVENTOR
ALFRED V. HEMMENS
By [signature] Atty.

Patented Aug. 11, 1953

2,648,225

UNITED STATES PATENT OFFICE 2,648,225

LIQUID METERING DEVICE

Alfred Victor Hemmens, Potts Point, near Sydney, New South Wales, Australia, assignor to A. V. Hemmens Pty. Limited, Sydney, New South Wales, Australia, a corporation of New South Wales Application January 15, 1951, Serial No. 206,015
In Australia February 13, 1950

4 Claims. (Cl. 73—223)

This invention relates to the metering of milk during the operation of milking machines. The invention provides means for automatically metering milk as it flows from each group of teat cups (that is from each cow) in the suction line of a milking machine. Further, the invention provides means for the retention of a vacuum during removal of teat cups from cows and for replacement of teat cups on cows. The invention also provides means to automatically sample milk as it is flowing from each cow. Still further, the invention provides means for closed circuit milking of cows and the canning of milk received therefrom under vacuum.

Present day milking machines are generally of two types known as bucket plants and releaser plants. The bucket plant permits the use of buckets into which milk from a cow is received and the contents then weighed on a milk scale, in order to obtain the cow's yield, whereas with the releaser plant the milk from all cows is received in a common milk line and it is not possible to obtain a cow's yield without interposing a bucket or fitting a volume type of milk recorder, requiring manual operation of valves and equipment and time loss in order to get proper reading of gathered milk.

In both said types of plant the milk is emptied from the machines into an open vat from which the milk flows by gravity into the usual type of transport can. An open type of cooler may be interposed. Both types only permit of the use of open types of coolers. Furthermore, both types of plant are subject to the lost time problem should the teat cups on one cow fall off resulting in loss of vacuum and the falling off of the teat cups in other bails of the plant due to this cause. In both types of plant milk sampling is a manual operation again absorbing time.

Milk flow from a cow varies considerably, both in rate, quantity, and quality, and is drawn from the cow by a pulsating vacuum of approximately 44 to 48 pulsations a minute and a vacuum of 15 inches of mercury controlled usually by a vacuum controller. The flow from a cow varies from as low as ½ lb. a minute to 20 lbs. a minute and the flow is intermittent. The present invention is devised to operate under these conditions and the apparatus is adaptable to any known type of present day milking machine.

Basically the invention is a metering apparatus consisting of a measuring chamber having an inlet in the bottom connected to milk collecting and de-aerating means in the milk line from each group of teat cups. There is a gravity valve in said chamber adapted to close said inlet. An emptying chamber is positioned above the measuring chamber. A suction pipe extends from the top of the measuring chamber into the emptying chamber and there is a float valve in the measuring chamber adapted to close said suction pipe. An adjustably positioned emptying and calibrating tube extends from near the bottom of the measuring chamber into the emptying chamber. An outlet from the emptying chamber to the suction line of a milking machine has a part positioned vertically and there is a magnet in this vertical part free to reciprocate for a determined distance. The magnet is constructed so that milk can flow past it and in flowing lift it. A second magnet is mounted on a counterbalanced lever outside said vertical part and in juxtaposition to said first magnet. A counter mechanism is operatively connected to said counterbalanced lever.

Suction in the suction line created by the usual milking machine draws milk from the teat cups into the milk collecting and de-aerating means which includes an air removal pipe and a foam trap. The milk flows through said trap to the measuring chamber lifting the inlet valve therein. When a predetermined quantity of milk enters the measuring chamber it lifts the float valve which closes the suction pipe and the inlet valve closes by gravity. Then owing to the suction in the emptying chamber the milk in the measuring chambers flows through the emptying and calibrating tube into said emptying chamber and through it to the suction line. The milk lifts the magnet thereby actuating the counter to record the quantity of milk taken from the measuring chamber in one operation of the apparatus. Air inlets to the several chambers permit the metering operation to continue in a regular intermittent cycle.

Where a milking machine does not include automatic vacuum retention means to operate when teat cups fall off, the present invention provides means for such purpose, which are desirable for the effective operation of the metering apparatus. The means consist of a valve housing positioned vertically in the suction line between the milk collecting and de-aerating means and the teat cups of the machine. There is a valve seat in the top of the housing and a valve in said housing. The weight of the valve and the ratio of its cross sectional area to the cross sectional area of the housing permits normal milk flow, but a charge of air entering the housing will lift the valve onto its seat. A small leak is provided across the valve seat which provides sufficient suction for the teat cups to be replaced when the valve will drop to open position again.

Associated with the metering apparatus is an automatic sample collector consisting of a pipe connection in the suction line having a bottle holder coupling thereon. There is a small opening through this coupling, which owing to the vacuum created in the bottle through the suction line admits a few drops of milk from each cycle of discharges from the metering apparatus.

Other features of the invention are hereinafter referred to.

The invention is described in detail with reference to one embodiment illustrated in the accompanying drawings in which.

Figure 1:
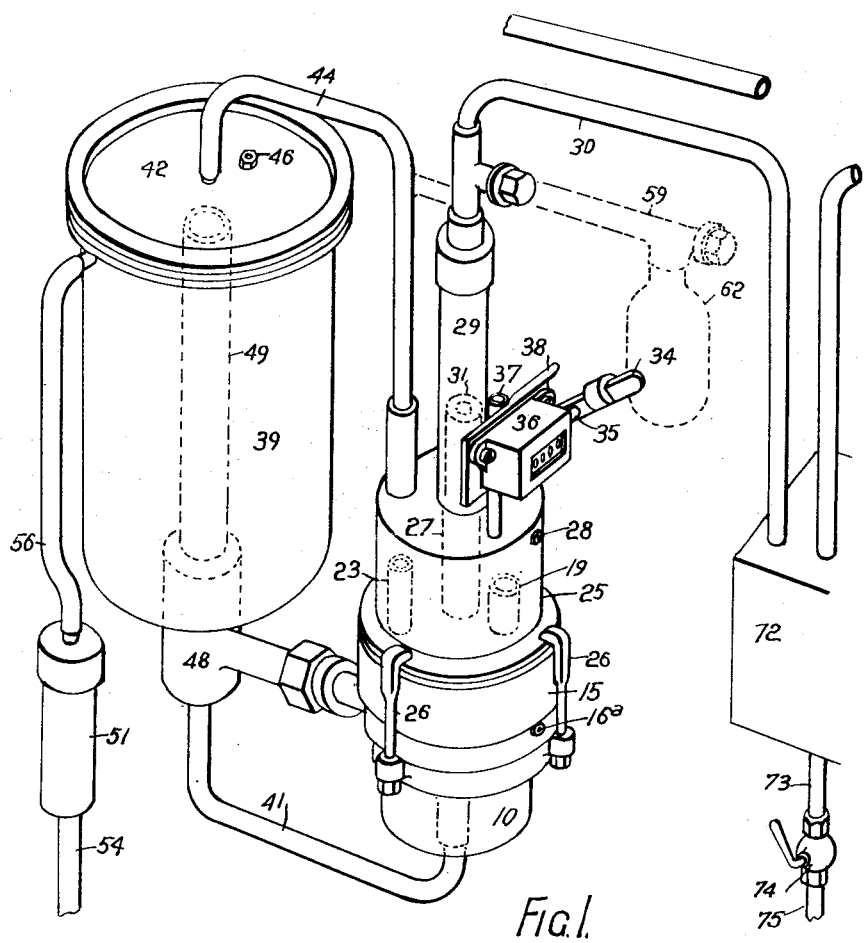
Fig. 1 is a perspective view of apparatus according to the invention.
Figure 2:
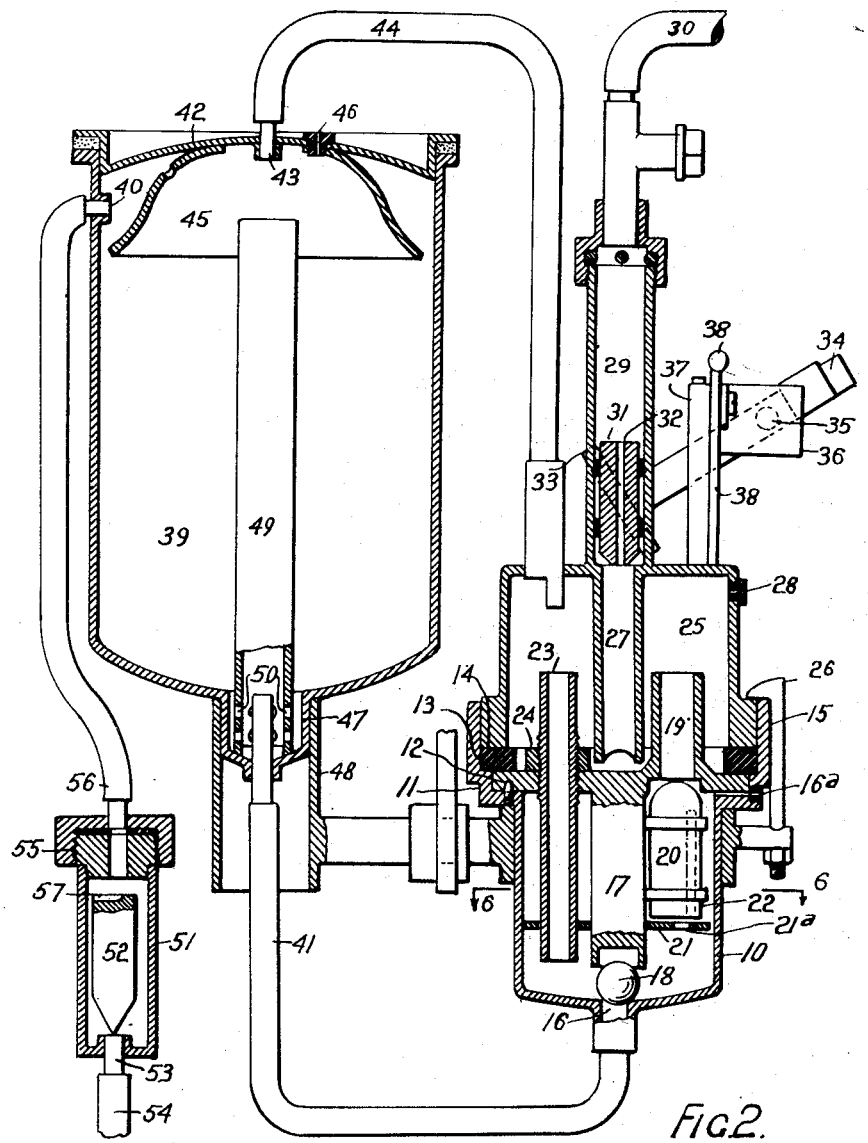
Fig. 2 is a central sectional elevation.
Figure 3:
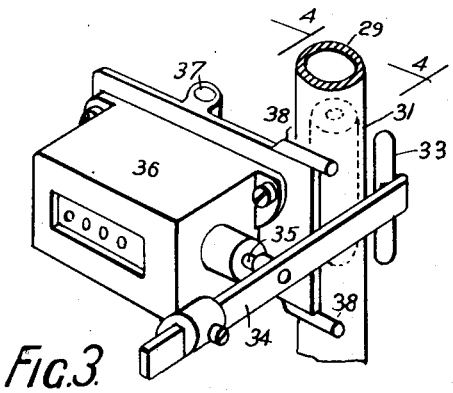
Fig. 3 is a fragmentary perspective view of counter recording means and appurtenances.
Figure 4:
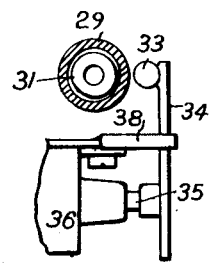
Fig. 4 is a sectional plan on plane 4—4, Fig. 3.

The metering apparatus consists of a measuring chamber 10 which preferably is a cylindrical vessel. It has an open top with a surrounding flange 11 which constitutes a seat for a cover plate 12 and the seat incorporates a sealing gasket. The top 13 of the flange 11 is a seating for part of a gasket 14 and it has a surrounding chimb 15. There is an inlet 16 in the bottom of the measuring chamber 10 and means are provided to connect a pipe thereto. An air vent 16a is positioned in the measuring chamber under the cover plate 12.

The cover plate 12 has a guide post 17 set downwardly; it is open at the bottom and a valve 18 adapted to seat on the inlet 16 can lift into said opening. The guide post keeps the valve in alignment with the inlet 16.

Figure 6:
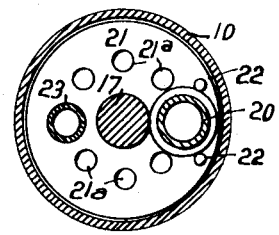
Fig. 6 is a sectional plan on line 6—6, Fig. 2.

A suction pipe 19 projects from the top of the cover plate 12 and there is an opening through said cover plate to said suction pipe; the bottom of said opening constitutes a valve seat. A float valve 20 is retained in alignment with the valve seat by a keep 21 and guides 22 fixed to the guide post 17. The keep is an annular disc with a plurality of holes 21a therein (see Fig. 6). The keep acts as a baffle and diffuser on milk flowing through the inlet 16.

An emptying and calibrating tube 23 projects through the cover plate 12; its position is adjusted by screwing and it is retained in position by lock nut 24. The height of the bottom of this above the bottom of the measuring chamber 10 determines the quantity of milk to be taken through the metering apparatus in one cycle of its operation. A convenient setting is for it to be low enough to take 3.2 fluid ounces from the measuring chamber in each cycle of operations.

Adjustability of the tube 23 is required only to regulate the metering apparatus to compensate for variations in the sizes of the parts during manufacture and wear of parts and to set the apparatus to the measuring systems employed in the country in which the invention is used.

By suitably designing the floatation level of the float valve 20 and by adjusting the height of the tube 23 each operative cycle of the metering apparatus will discharge an equal amount of milk. The float valve by reason of its buoyancy compensates variations in the specific gravity of milk—therefore the apparatus will always give an accurate recording of the weight of milk passing through it.

An emptying chamber consisting of an open bottom vessel 25 with an external flange around the bottom is mounted on the gasket 14 within the chimb 15. It is locked in position by clamping bolts 26 which are secured in the bracket in which the measuring chamber 10 is mounted. The emptying chamber has an internal pipe 27 which extends from a suction opening in the bottom to the top of said chamber. There may be an air vent 28 adjacent to the top of the chamber.

A vertical pipe 29 made of a material which will permit the flow of magnetic flux therethrough projects above the emptying chamber 25 in communication with the internal pipe 27. At the top it has a connection to the suction line 30 of the milking machine. In the vertical pipe 29 there is a magnet 31 which is free to travel the length of said pipe. The magnet 31 has a hole 32 through it and it is designed to allow the suction of the milking machine to draw milk through the metering apparatus and for the milk flowing through the pipe 29 in one cycle at operations to lift the magnet.

A second magnet 33 is mounted on a counterbalanced lever 34 outside the vertical pipe 29 and in juxtaposition to the magnet 31. The lever is mounted on the spindle 35 of a standard ratchet actuated counter 36 fixed to bracket 37. Stops 38 limit the movement of the lever 34.

Suction in the pipe 30 created by the usual milking machine draws milk through the measuring chamber inlet 16 lifting the valve 18 to do so. The level of the milk rising in said chamber lifts the float valve 20 until it closes onto the valve seat of the suction pipe 19 thus stopping the inflow of milk and allowing the valve 18 to fall onto its seat.

With the closing of the float valve 20 the suction of the milk line transfers to the emptying and calibrating tube 23 which draws milk above its inlet in the measuring chamber into the emptying chamber 25. When the milk falls below the inlet to the tube 23, the float valve 20 falls and the operation of filling the measuring chamber again commences.

The determined quantity of milk reaching the emptying chamber 25 through the tube 23 is drawn through the pipe 27 and the vertical pipe 29 into the milk line of the milking machine, the air vent 28 facilitating this movement. In its passage through the vertical pipe 29 the milk lifts the magnet 31 and the magnet 33 moved by attraction thereto part rotates the spindle 35 thereby actuating the counter 36.

It is essential that the milk be substantially de-aerated as it enters this measuring chamber 10 and milk collecting and de-aerating means are provided for this purpose and connected in the milk line between the inlet 16 and the teat cups to which the metering apparatus is applied.

Figure 7:
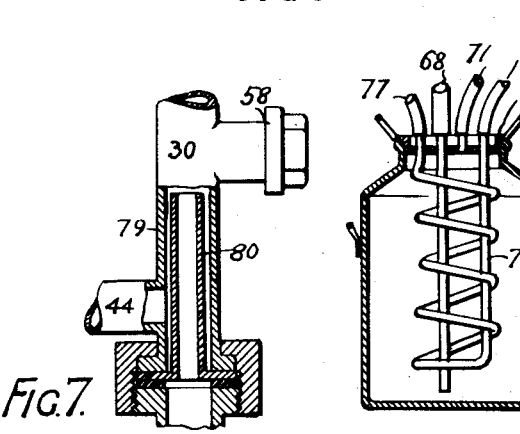
Fig. 7 is a vertical sectional detail of modified coupling means between the collection and de-aerating receptacle and the metering apparatus.
Figure 8:
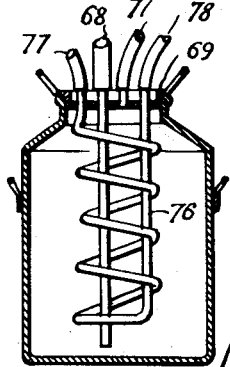
Fig. 8 is a sectional view of a standard milk transport can with an immersion cooler therein.
Figure 9:
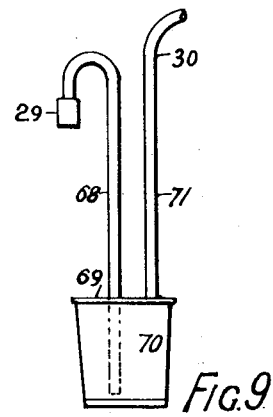
Fig. 9 is a diagram of bucket and pipe connections.

The milk collecting and de-aerating means consist of a receptacle 39 having a milk inlet 40 and a milk outlet pipe 41 at the bottom, the latter connecting with the inlet 16 of the metering apparatus. A removable lid 42 is seated on a gasket in the top of the receptacle 39 and there is an outlet 43 through the lid with a pipe 44 connecting said outlet with the suction line of the milking machine. As shown this pipe 44 is connected to the top of the emptying chamber 25. An alternative connection is shown in Fig. 7. A shroud 45 fixed to the lid 42 prevents milk flowing through the inlet 40 entering the outlet 43. There is an air vent 46 in the lid. The shroud diverts milk entering the receptacle 39 onto the internal wall thereof thus helping to release entrapped air and gas as the milk falls in the receptacle.

There is a sump 47 in the bottom of the receptacle 39 and the receptacle is supported by bracket 48 surrounding the sump. A tube 49 of larger diameter than the outlet pipe 41 opened at the top and bottom and having holes 50 through the wall near the bottom is seated on the bottom of the sump. The outlet pipe 41 projects into the tube 49 to a position above the holes 50.

Milk entering the receptacle 39 forms a quiescent pool therein and the construction of the sump and its parts prevent foam entering the outlet pipe 41. The air vent 46 permits the milk to flow freely from the receptacle 39. All separated and intermixed incoming gas with the milk and excess air entering through the vent 46 is extracted through the pipe 44, thus maintaining the proper degree of vacuum in the pipe connecting the inlet 40 to the teat cups.

The capacity of the receptacle 39 and the construction of the several components is such as will give storage for fast milking cows and a quiescent flow of de-foamed and de-aerated milk to the metering apparatus.

The effective operation of the metering apparatus requires that the system be maintained under uninterrupted vacuum. For this purpose the invention provides vacuum retention means which become operative in the event that non-sealable teat cups fall off a cow in a milking operation. The means consist of a valve housing 51 having a valve 52 therein adapted to move vertically within the housing. There is an inlet 53 in the bottom of the housing with a pipe 54 connecting to one group of teat cups. A cap 55 on the housing has a pipe 56 connecting to the inlet 40 of the milk collecting and de-aerating means. The bottom of the cap 55 is a valve seat with which the valve 52 is adapted to register. There is a leak port 57 in the valve or it may be incorporated in the valve seat.

The weight of the valve and the ratio of its cross sectional area to the cross sectional area of the housing permits normal milk flow, but a charge of air entering the housing will lift the valve onto its seat. The leak port 57 provides sufficient suction for the teat cups to be replaced and to equalise the negative pressures on each side of the valve thus permitting it to drop and normal milk flow to recommence.

Figure 5:
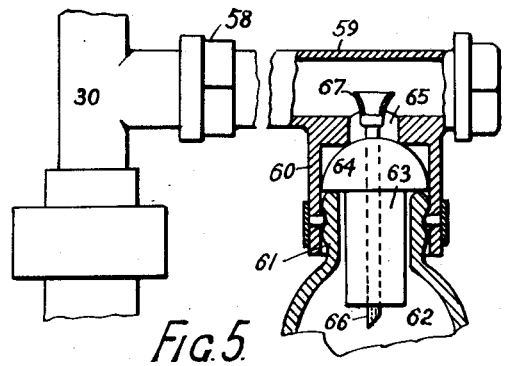
Fig. 5 is a fragmentary sectional detail view of a milk sampling bottle as affixed to the apparatus.

Associated with the metering apparatus is an automatic sample collector. It consists of a coupling 58 on the pipe 30 (see Fig. 5) provided with a sealing cap and adapted when the sealing cap is removed to take a branch pipe 59. This pipe has a socket 60 in which the neck 61 of a bottle 62 is adapted to be secured by any convenient means. A flexible stopper 63 is provided to fit the bottle. It has a head 64 adapted to seal the opening 65 in the branch pipe 59. A needle tube 66 is fitted in the stopper 63. It may have a funnel end 67 which extends into the opening 65.

As each measured quantity of milk passes along the pipe 30 past the coupling 58 the vacuum in the bottle becomes momentarily higher than that in the pipe line and by reason of this high vacuum a few drops of milk are drawn into the bottle from each batch. Thus a true mixed sample of milk passing through the metering apparatus is obtained.

In order to initially calibrate the metering mechanism and to check the setting from time to time, if required, provision is made to interpose between the pipes 29 and 30 a pipe 68 which passes through a lid 69 adapted to be air tightly fitted to a weighing bucket 70. The pipe 68 may project to near the bottom of the bucket and pipe 71 from the lid 69 connects back to the milk pipe line 30 or in the case of a "bucket" type plant, to the air line to which the reference 30 also applies.

It will be appreciated that a milk transport can or a number of such cans with appropriate pipe connections as described above, can be substituted for the weighing bucket. Such a set up provides a sealed collection of milk and, in the case of releaser type milking machines, eliminates the necessity for fitting a "releaser."

Alternatively a collecting tank 72 may be interposed in the pipe line 30. This tank has a gravity outlet 73 with a control valve 74 and one or more delivery pipes 75 may be provided to deliver milk to cans.

The can lids 69 may have attached thereto a pipe 76 with an inlet 77 and an outlet 78 adapted for connecting to a cooling medium.

The recording counter 36 may be of totalising and batch type, whereby a progressive total is given as well as the individual total, and these counters can be fitted with or without zero resetting attachments.

Instead of connecting the pipe 44 to the top of the emptying chamber 25 as described above, the alternative arrangement illustrated in Fig. 7 may be employed. It has advantages over the former connection where such a quantity of air enters the system as would be likely to interfere with the effective operation of the magnet 31.

In this alternative arrangement a pipe 79 is made to be interposed between the pipes 29 and 30. For convenience the pipe 79 incorporates the coupling 58 for the sampling means. The pipe 79 has an annular cavity formed therein by internal pipe 80. The cavity is open at the top but is sealed at the bottom by a flange on said internal pipe 80. The pipe 44 is connected to the pipe 79 at the position of the annular cavity.

I claim:

1. A liquid metering device comprising a measuring chamber adapted to be disposed between a source of liquid and a suction line, said chamber having an inlet in the bottom for connection to said source and an outlet in the top for connection to said suction line, said outlet including a vertical tube of magnetic flux transmitting material, an interior cylindrical magnet slidably disposed for vertical reciprocation within said tube, said magnet having a cross-sectional area less than the inside diameter of said tube to permit the restricted passage of liquid relative thereto in said tube, a counter mechanism having an oscillatable operator, an exterior magnet attached to said operator in the field of flux of said interior magnet, a gravity check valve in said measuring chamber for controlling the flow of liquid to said measuring chamber, a suction pipe projecting from the top of said measuring chamber and a float check valve in said measuring chamber adapted to close said suction pipe, and a by-pass pipe having its lower end between said check valves and its upper end communicating with said outlet.

2. A liquid metering device comprising a chamber adapted to be disposed between a source of liquid and a suction line, said chamber having an inlet for connection to said source and an outlet for connection to said suction line, said outlet including a vertical tube of magnetic flux transmitting material, an interior cylindrical magnet slidably disposed for vertical reciprocation within said tube, said magnet having a cross-sectional area less than the inside diameter of said tube to permit the restricted passage of liquid relative thereto in said tube, a counter mechanism having an oscillatable operator, an exterior magnet attached to said operator in the field of flux of said interior magnet, and means within said chamber for controlling the flow of liquid through said outlet, said means comprising a partition separating the chamber into an upper compartment and a lower compartment, the chamber inlet being at the bottom of the said lower compartment, a gravity check valve cooperating with said inlet, said partition having a vent therethrough with a suction pipe therefrom extending into the upper compartment, a float check valve for said vent in said lower compartment, a by-pass pipe extending through said partition having its lower end located at a level between said valves and its upper end extending above the partition to an extent similar to said suction pipe, said outlet comprising a dip tube extending into the upper compartment and terminating therein at a point below the top of said suction pipe and said by-pass pipe.

3. A liquid metering device as defined by claim 2 having means cooperating with said partition for adjusting the position of the upper and lower ends of the by-pass pipe in said compartments.

4. A liquid metering device as defined by claim 2 in which the upper and lower compartments are provided with vents communicating with the exterior of the chamber.

ALFRED VICTOR HEMMENS.

References Cited in the file of this patent

UNITED STATES PATENTS

| Number | Name | Date |
|---|---|---|
| 474,241 | Goodman et al. | May 3, 1892 |
| 1,223,334 | Wielaert | Apr. 17, 1917 |
| 1,546,437 | Daysh | July 21, 1925 |
| 1,992,991 | Colley | Mar. 5, 1935 |
| 2,310,504 | Aubert | Feb. 9, 1943 |
| 2,604,561 | Simon | July 22, 1952 |